United States Patent
Malmberg et al.

(10) Patent No.: US 9,199,208 B2
(45) Date of Patent: Dec. 1, 2015

(54) HOMOGENIZING VALVE HAVING RADIALLY AND AXIALLY ARRANGED GAPS

(75) Inventors: Rolf Malmberg, Varberg (SE); Jozo Valencuk, Hällestad (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 13/997,190

(22) PCT Filed: Dec. 20, 2011

(86) PCT No.: PCT/EP2011/073455
§ 371 (c)(1),
(2), (4) Date: Jul. 9, 2013

(87) PCT Pub. No.: WO2012/084986
PCT Pub. Date: Jun. 28, 2012

(65) Prior Publication Data
US 2014/0177382 A1    Jun. 26, 2014

(30) Foreign Application Priority Data
Dec. 22, 2010 (SE) ..................... 1001213

(51) Int. Cl.
*B01F 5/06* (2006.01)
*A01J 11/16* (2006.01)
*B01F 3/08* (2006.01)

(52) U.S. Cl.
CPC ............... *B01F 5/0681* (2013.01); *A01J 11/16* (2013.01); *B01F 3/0807* (2013.01); *B01F 5/068* (2013.01); *B01F 5/0664* (2013.01); *B01F 5/0665* (2013.01); *B01F 2003/0849* (2013.01); *B01F 2215/0431* (2013.01); *B01F 2215/0468* (2013.01); *B01F 2215/0472* (2013.01)

(58) Field of Classification Search
CPC .... B01F 3/0807; B01F 5/0664; B01F 5/0665; B01F 5/0681; B01F 5/068; B01F 2003/0849; B01F 2215/0431; B01F 2215/0468; B01F 2215/0472; A01J 11/16
USPC .................... 366/176.1–176.4; 137/803–842; 138/42–43
See application file for complete search history.

(56) References Cited

U.S. PATENT DOCUMENTS 1,097,474 A * 5/1914 Schroder ................. 366/336
2,137,854 A * 11/1938 Ordway ................... 138/46
(Continued)

FOREIGN PATENT DOCUMENTS

DE       1147920        5/1963
FR        451028    *   4/1913
(Continued)

*Primary Examiner* — Charles Cooley
(74) *Attorney, Agent, or Firm* — Finnegan, Henderson, Farabow, Garrett & Dunner LLP

(57) ABSTRACT

The invention relates to a homogenizing valve which comprises two or more pressurized, movable valve cones, two or more valve seats, and a valve housing which surrounds the valve cones and the valve seats. The valve cones and the valve seats are arranged such that between them are formed constrictions, which constitute homogenization gaps having a gap height h. Between each individual valve cone and each individual valve seat are formed two homogenization gaps, of which one homogenization gap is radially arranged and one homogenization gap is axially arranged. The homogenizing valve is intended for use in existing homogenizers and is especially produced to be able to acquire an effective homogenization for liquids which are processed at a lower pressure and with a large flow, such as pasteurized milk, for example.

10 Claims, 5 Drawing Sheets

(56) References Cited

U.S. PATENT DOCUMENTS

| | | | |
|---|---|---|---|
| 2,435,884 A | 2/1948 | Galewski | |
| 2,995,346 A * | 8/1961 | Samples | 366/98 |
| 3,179,385 A * | 4/1965 | Deackoff | 426/519 |
| 3,226,029 A * | 12/1965 | Goodman et al. | 239/4 |
| 3,423,028 A * | 1/1969 | Stupakis | 239/427.3 |
| 3,473,787 A * | 10/1969 | Bartlett | 366/176.2 |
| 3,544,078 A * | 12/1970 | Stupakis | 366/178.3 |
| 3,585,357 A | 6/1971 | Mandell | |
| 4,585,357 A * | 4/1986 | Ogata | 366/176.2 |
| 5,749,650 A * | 5/1998 | Kinney et al. | 366/176.2 |
| 5,899,564 A * | 5/1999 | Kinney et al. | 366/176.2 |
| 6,234,206 B1 * | 5/2001 | Malmberg et al. | 137/625.33 |
| 6,238,080 B1 * | 5/2001 | Jarchau | 366/176.2 |
| 6,244,739 B1 * | 6/2001 | Jarchau et al. | 366/176.2 |
| 6,305,836 B1 * | 10/2001 | Jarchau | 366/176.2 |
| 6,502,979 B1 * | 1/2003 | Kozyuk | 366/176.2 |
| 6,705,755 B1 * | 3/2004 | Innings et al. | 366/176.1 |
| 6,802,639 B2 * | 10/2004 | Kozyuk | 366/176.2 |
| 7,086,777 B2 * | 8/2006 | Kozyuk | 366/176.2 |
| 7,314,306 B2 * | 1/2008 | Kozyuk | 366/176.2 |
| 8,066,425 B2 * | 11/2011 | Boer et al. | 366/176.2 |
| 8,568,019 B2 * | 10/2013 | Waldron et al. | 366/181.5 |
| 8,585,277 B2 * | 11/2013 | Grandi et al. | 366/176.2 |
| 8,944,673 B2 * | 2/2015 | Malmberg et al. | 366/176.2 |
| 2006/0193199 A1 * | 8/2006 | Kozyuk | 366/176.2 |
| 2009/0141584 A1 * | 6/2009 | Boer et al. | 366/336 |
| 2010/0296363 A1 * | 11/2010 | Grandi et al. | 366/176.3 |
| 2010/0329073 A1 * | 12/2010 | Malmberg et al. | 366/176.3 |
| 2014/0177382 A1 * | 6/2014 | Malmberg et al. | 366/176.2 |
| 2015/0173322 A1 * | 6/2015 | Malmberg et al. | |

FOREIGN PATENT DOCUMENTS

| | | |
|---|---|---|
| GB | 15774 | 0/1914 |
| GB | 1194126 A * | 10/1977 |
| RU | 2201795 C2 * | 4/2003 |
| SE | 531 925 C2 | 9/2009 |
| WO | WO 2009/096825 A1 | 8/2009 |

* cited by examiner

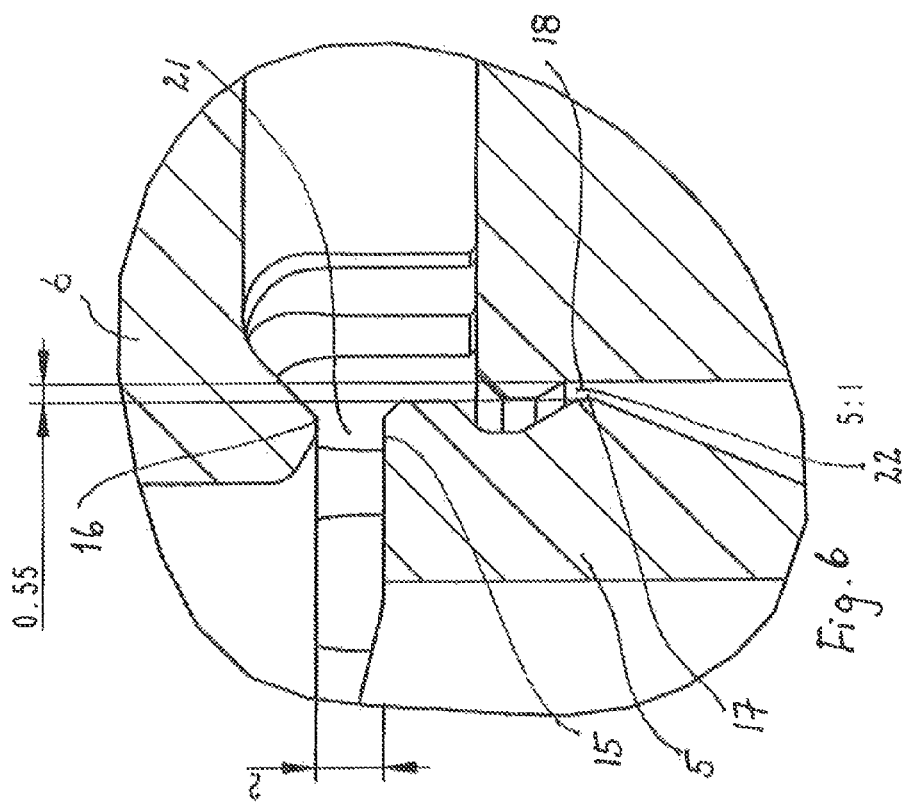
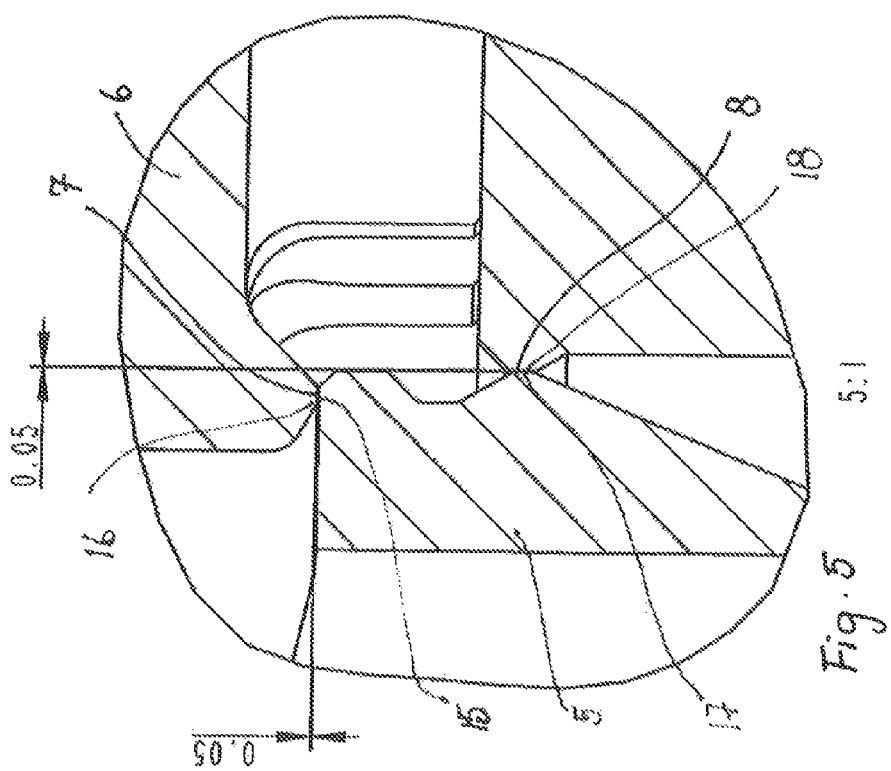

HOMOGENIZING VALVE HAVING RADIALLY AND AXIALLY ARRANGED GAPS

CROSS-REFERENCE TO RELATED APPLICATIONS

This is a U.S. National Phase of PCT/EP2011/073455, filed Dec. 20, 2011, which claims the benefit of priority to Swedish Patent Application No. 1001213-6, filed Dec. 22, 2010, which is incorporated herein by reference.

TECHNICAL FIELD

The present invention relates to a homogenizing valve comprising two or more pressurized, movable valve cones, two or more valve seats, and a valve housing surrounding the valve cones and the valve seats, wherein the said valve cones and the said valve seats are arranged such that between them is formed a constriction, constituting two or more homogenization gaps, and wherein the valve cones are screwed on a threaded rod arranged centrally in the valve housing, and wherein the valve cones are arranged such that they are adjusted together with the threaded rod.

BACKGROUND

Homogenization is a long-used industrial process which aims, in a fatty emulsion such as milk, for example, to split the largest fat globules into smaller fat globules and thereby stabilize the fatty emulsion. For milk, for example, this means that creaming is prevented and the bulk of all consumer milk is nowadays homogenized.

The homogenization is usually carried out by mechanical processing, so that the fatty emulsion, which has a high input pressure, is forced to pass at high velocity through a very narrow gap, in which the fat globules of the fatty emulsion are broken up by the turbulence which is generated at high velocities and by cavitation bubbles which implode in the liquid. The process takes place for a very short period and what happens during this period is that the velocity of the fatty emulsion during passage increases as the pressure decreases, which causes the liquid to boil.

A homogenizer essentially consists of a large piston pump, which produces a high pressure, and a counterpressure device, in which the actual homogenization takes place. The counterpressure device or homogenizing valve in turn consists of a pressurized, resilient valve cone, a valve seat, as well as a wearing ring and a valve housing, which surround the valve cone and the valve seat. The valve cone and the seat are usually rotationally symmetric and arranged such that a radial constriction, which constitutes a homogenization gap, appears between these two parts. The height, width and length of the gap determine the volume at which the homogenization takes place. This volume must be sufficiently small to obtain an effective homogenization. The gap height is reduced in the event of a higher pressure upon the liquid which is to be homogenized, at the same time as a larger flow means that the gap height is increased.

Particularly in the homogenization of pasteurized milk, compared with UHT-treated milk, a lower pressure is employed, at the same time as it is wished to increase the flow quantity. This means that the homogenizing valve would need to be made larger, so that the gap height decreases, in order to obtain good homogenization at this lower pressure and increased flow. It has been shown, however, that an up-scaling of existing, well-functioning homogenizing valves does not always work especially well in practice. The larger the pressurized surface which is acquired, the greater are the forces generated and the larger must be the homogenizing valve. At the same time, the costs of such a homogenizing valve rise many times over.

Another way of solving the problem is to connect a number of homogenization gaps in parallel, as shown in European patent specification EP 034 675. In this way, an extension of the gap length, and thus a reduction in gap height, is obtained. This type of homogenizing valve with parallel-connected homogenization gaps has, however, a virtually fixed gap height. Without conversion, it permits only one flow and one homogenizing pressure. It also has the drawback that it wears in an uneven and uncontrollable manner, which adversely affects the homogenization result.

BRIEF SUMMARY

Swedish patent application SE 531 925 discloses how a plurality of parallel-connected homogenization gaps can be arranged by a threaded rod being placed centrally in the valve housing and by the valve cones being able to be adjusted together with the threaded rod. This homogenizing valve can be adjusted for different flows.

One object of the present invention is to obtain a homogenizing valve which offers good adjustability in terms of gap length, at the same time as a lower gap height is acquired. The homogenization gap has small gap height, combined with high capacity and a low homogenizing pressure.

A further object of the present invention is that the gap height can be adjusted when pressure and flow vary.

Another object of the present invention is that, by making the homogenizing valve shorter, it becomes cheaper to produce.

Yet another object of the present invention is that the homogenizing valve shall allow effective washing and shall otherwise meet the exacting requirements of food handling.

These and other objects have been achieved according to the invention by virtue of the fact that the homogenizing valve of the type described in the introduction has been given the characteristics that between each and every valve seat and valve cone is formed a radially arranged homogenization gap and an axially arranged homogenization gap.

Preferred embodiments of the invention have further been given the characteristics evident from the sub-claims.

BRIEF DESCRIPTION OF THE DRAWINGS

A preferred embodiment of the invention will now be described in greater detail with reference to the appended drawings, whereof:

FIG. 5 shows, partially in section, an enlarged detail A of FIG. 3

FIG. 6 shows, partially in section, an enlarged detail B of FIG. 4.

The drawings show only those details which are fundamental to an understanding of the invention and the positioning of the homogenizing valve in the homogenizer, which is well-known to the person skilled in the art, is omitted.

DETAILED DESCRIPTION

Figure 1:
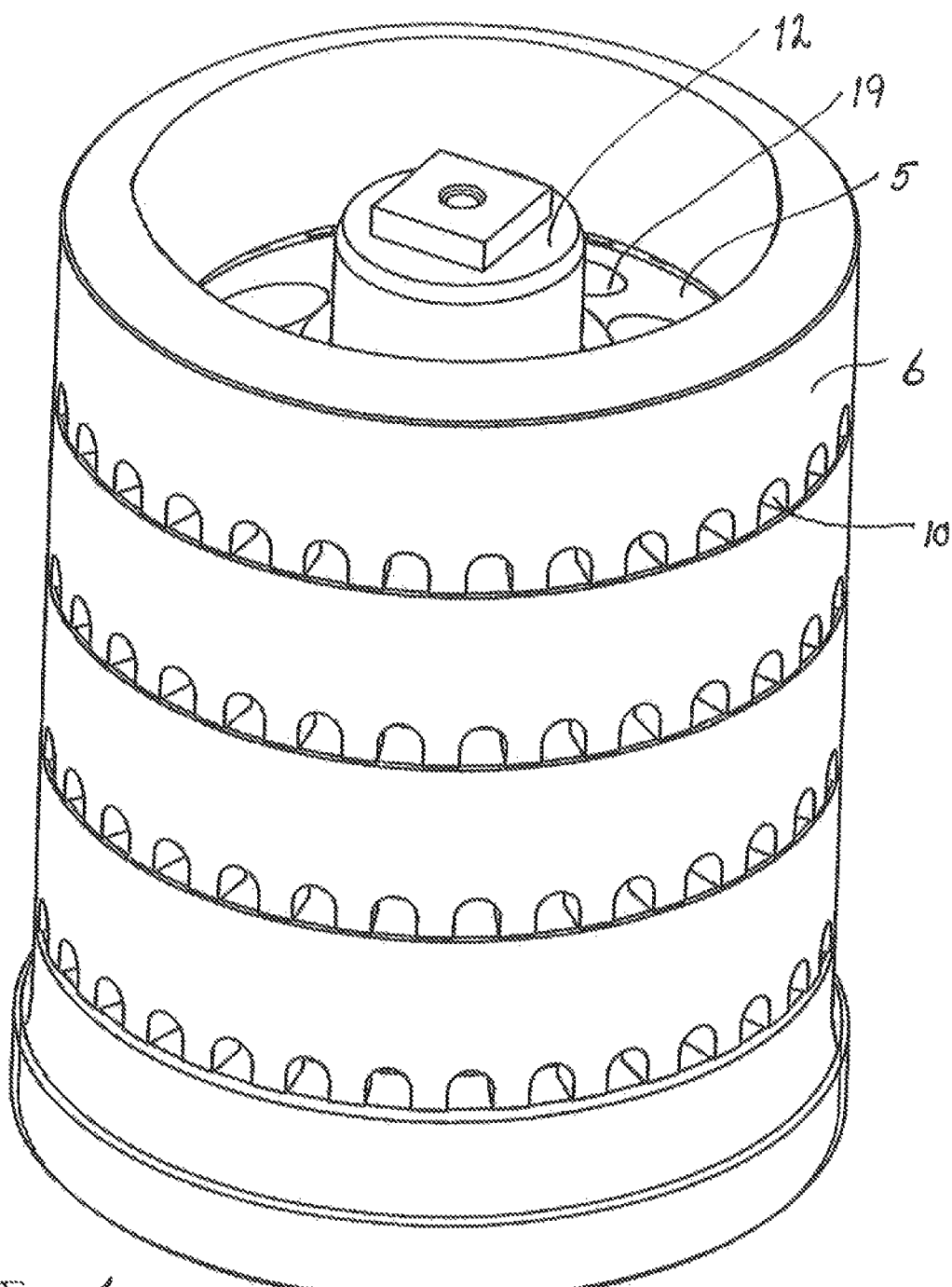
FIG. 1 shows a perspective drawing of the device
Figure 2:
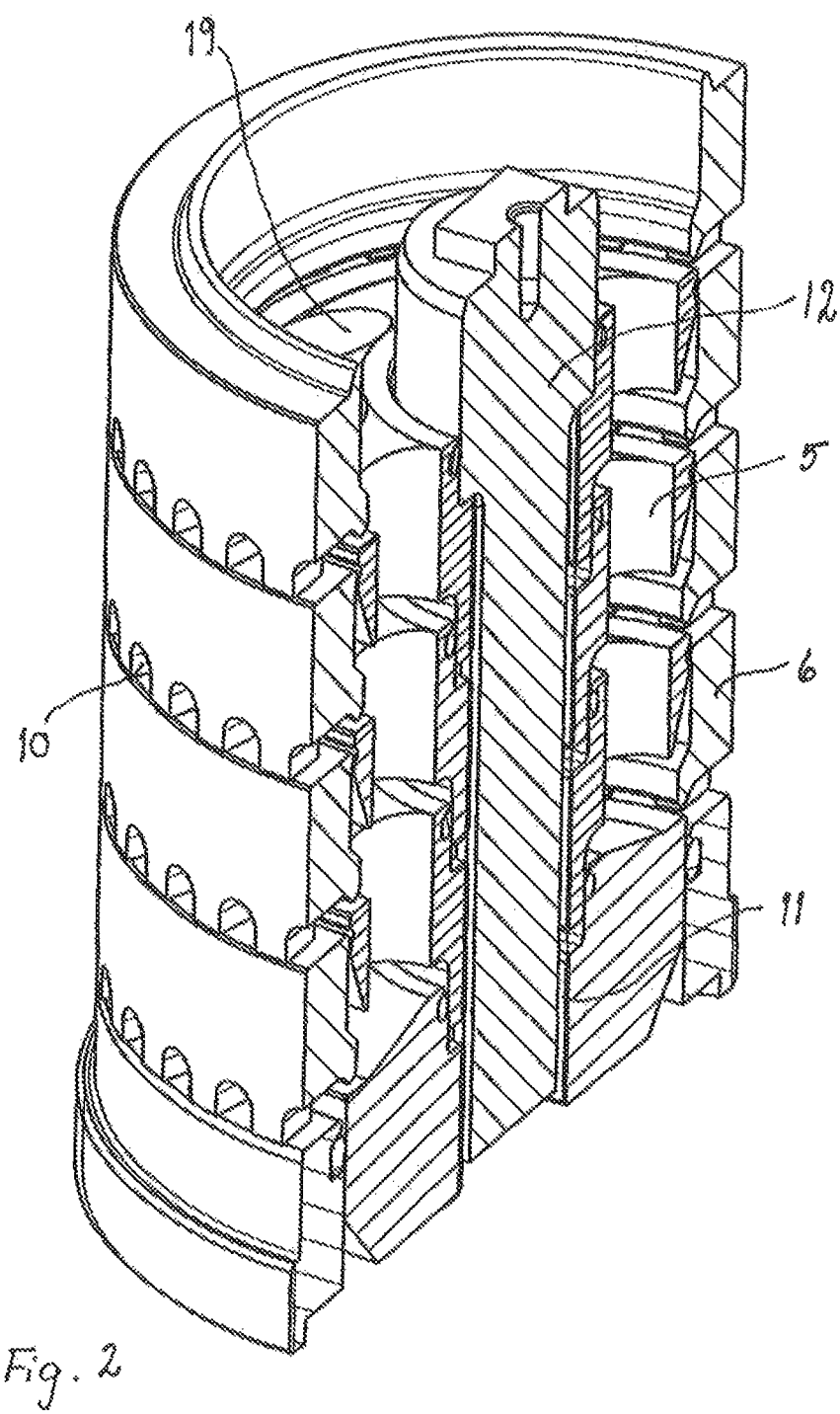
FIG. 2 shows a partially sectioned perspective drawing of the device
Figure 3:
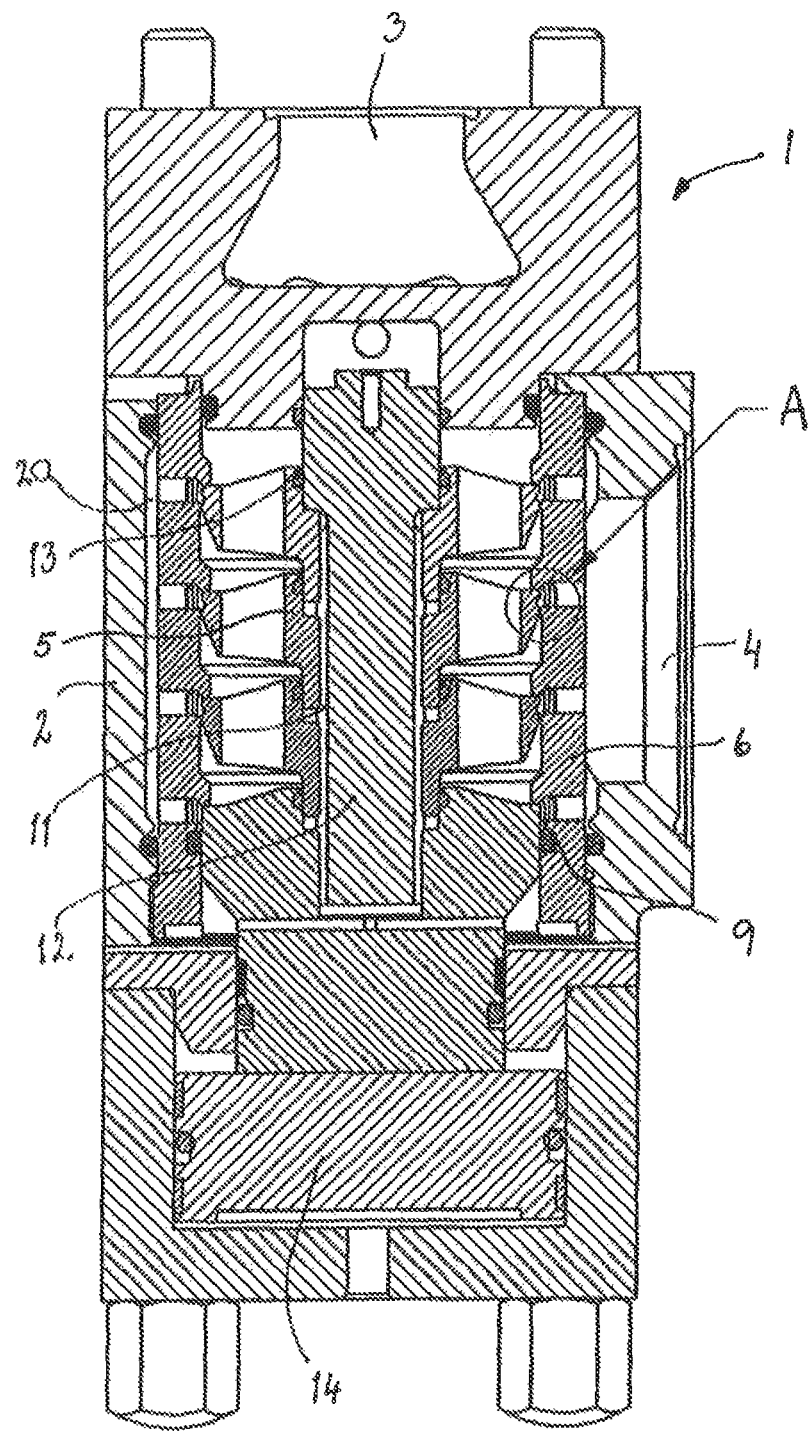
FIG. 3 shows, partially in section, a side view of the device during production

A homogenizing valve 1 according to the invention, as shown in FIG. 1-3, essentially consists of a valve housing 2 having an inlet 3 and an outlet 4 for the liquid which is to be homogenized, as well as a plurality of valve cones 5 and a plurality of valve seats 6.

The valve cones 5 and the valve seats 6 are arranged such that between them are formed constrictions, homogenization gaps. Between each valve seat 6 and each valve cone 5 are formed two homogenization gaps, a radially arranged homogenization gap 7 and an axially arranged homogenization gap 8.

The fact that the seals, the O-rings, which formed a seal between the valve cones 5 and the valve seats 6, have been removed means that an additional homogenization gap 7, 8 is respectively acquired for each valve seat 6 and valve cone 5. However, the lower O-ring 9 remains to form a seal against the valve housing.

The fact that the O-rings have been largely removed means that more homogenization gaps 7, 8 for each valve cone 5 and valve seat 6 are acquired. The homogenizing valve 1 can thus be made much shorter, and whereas a homogenizing valve 1 which previously had a capacity of six homogenization gaps required six valve cones 5 and six valve seats 6, in its new embodiment it only requires four valve cones 5 and four valve seats 6, which gives a corresponding capacity of seven homogenization gaps 7, 8.

In the preferred embodiment, the valve seats 6 are rotationally symmetric and have openings 10 which allow the liquid to be homogenized to pass through. The valve seats 6 are placed one on top of the other and are fixed to the valve housing 2.

The valve cones 5, which are also rotationally symmetric, have a threaded surface 11 towards the centre of the homogenizing valve 1. In the centre of the homogenizing valve 1 is arranged a threaded rod 12, the threads of which positively engage in the threaded surfaces 11 of the valve cones 5. The threaded-together portions are sealed off, by means of hygienic seals 13 of the O-rings type, from the product which passes through the valve cones 5.

The valve cones 5, threaded together with the threaded rod 12, are pressure-loaded, usually by a hydraulic or pneumatic piston 14, but in simpler embodiments can be pressure-loaded with a set screw, which acts via a spring. The valve cones 5 are also movable, for example by way of the oil in the cylinder, in order to be able to absorb the rapid flow variations which arise in the liquid to be homogenized. The elasticity is necessary to handle the flow variations which naturally occur in piston pumps.

The valve cones 5 and the threaded rod 12 are positioned in the valve housing 2 such that between the radial surfaces 15 of the valve cones 5 and the radial surfaces 16 of the valve seats 6 are formed radial homogenization gaps 7 of a height h. The height h of the homogenization gap 7 can be varied with a varied pressure and flow, by the valve cones 5 being moved closer to or farther away from the valve seats 6. Since the valve cones 5 are threaded on the threaded rod 10, it is possible to acquire exactly the same height h for all radial homogenization gaps 7 in the homogenizing valve 1.

Between the axial surfaces 17 of the valve cores 5 and the axial surfaces 18 of the valve seats 6 are also formed homogenization gaps 8. These axial homogenization gaps 8 are fixed, however, and cannot be adjusted by the threaded rod 12.

In the valve housing 2 of the homogenizing valve 1 is arranged a number of valve cones 5 and a number of valve seats 6. In FIG. 1-3, four valve cones 5 and four valve seats 6 are shown. Seven homogenization gaps, four radial and three axial 8, are thereby acquired. A homogenizing valve 1 according to the invention may contain both more and fewer valve cones 5 and valve seats 6, depending on the desired capacity and application. By producing the valve housing 2 in parts, it is easily possible to assemble a greater or lesser number of valve cones 5 and valve seats 6.

The liquid, usually milk, which is to be homogenized is led into the homogenizer, where it is pressurized to approx. 10-25 Mpa. The milk normally has a fat content of 0.5-3.5% and a temperature of 55-80° C.

The liquid is led in through the inlet 3 and passes through the holes 19 which are present in the valve cones 5. After this, the liquid passes through one of the different homogenization gaps 7, 8, where the homogenization takes place. The liquid subsequently passes out through the holes 10 in the valve seats, after which the liquid is collected in the channels 20. Since the liquid always strives to take the simplest route, a relatively even distribution of liquid through the different homogenization gaps 7, 8 is acquired. After the homogenization, the liquid passes out of the homogenizing valve 1, through the outlet 4.

The gap height h is normally 50-200 μm. During passage, a very rapid drop in pressure down towards 0 Mpa is acquired, at the same time as the velocity of the liquid increases, which causes the liquid to begin to boil. When the liquid leaves the homogenization gaps 7, 8, the velocity decreases and the pressure rises again. The liquid stops boiling and the steam bubbles in the liquid implode. The entire process takes place over just a few fractions of a second and, in the violent process in which the high velocity gives rise to turbulence and cavitation, the fat particles present in the liquid will be split into smaller particles.

Since an even distribution of the liquid between the different homogenization gaps 7, 8 is obtained, very good use is made of the increased gap length and a homogenizer having a homogenizing valve 1 according to the invention can handle a flow many times larger than a conventional homogenizing valve. At the same time, the homogenizing valve is adjustable for variations in the product flow, since the piston can displace the valve cones 5 in relation to the valve seats 6 and can thereby acquire a different height h of the radial homogenization gaps 7. Since the valve cones 5 are threaded on the threaded rod 12, all the radial homogenization gaps 7 have the same gap height h. All valve cones 5, as well as the threaded rod 12, are adjusted as a unit, so that all the radial homogenization gaps 7 always have the same gap height h.

Figure 4:
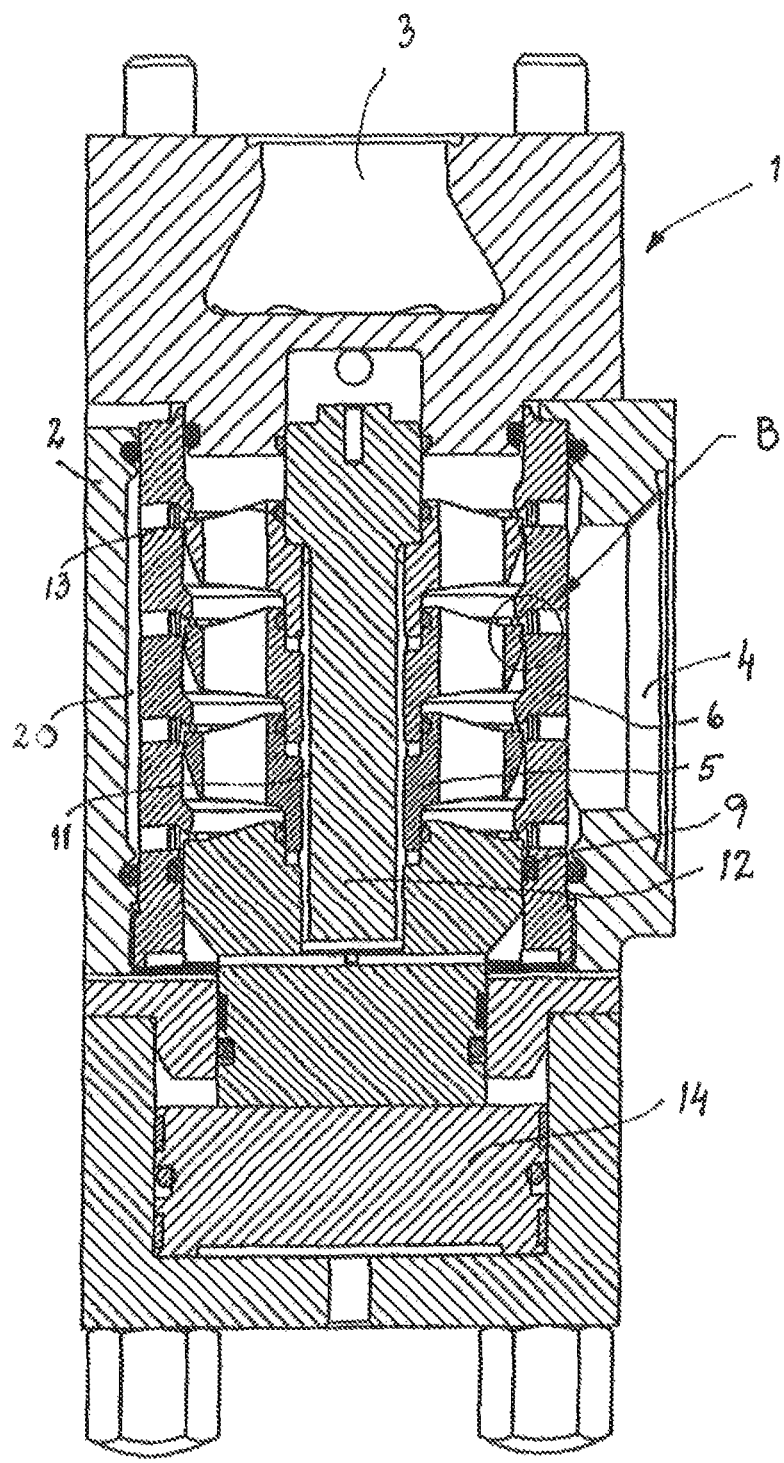
FIG. 4 shows, partially in section, a side view of the device during washing

In FIGS. 4 and 6, the homogenizing valve 1 is shown in its washing position. The pressure upon the valve cones 5 has been relieved by virtue of the fact that the pneumatic or hydraulic piston relaxes and then affords openings 21, 22 in which the homogenization gaps 7, 8 are normally found. Washing liquid can pass freely through these openings 21, 22 and all parts of the homogenizing valve which come into contact with the product can be washed effectively.

As will have been evident from the above description, a homogenizing valve which can be used for installation in existing homogenizers, but which can handle a much larger flow than a corresponding, conventional homogenizing valve, is realized with the present invention. At the same time, the homogenizing valve can be adjusted for momentary variations in pressure and flow. The adjustability of the homogenizing valve means that it also exhibits better characteristics with respect to wear and tear than previously known homogenizing valves. The length and configuration of the homogenizing valve also makes it relatively cheap to produce.

The invention claimed is:
1. A homogenizing valve comprising:
two or more pressurized, movable valve cones;
two or more valve seats; and a valve housing surrounding the valve cones and the valve seats and including an axis, wherein the valve cones and the valve seats are arranged such that between them is formed a constriction, and wherein the valve cones are screwed on a threaded rod arranged centrally in the valve housing, and wherein the valve cones are arranged such that they are adjusted together with the threaded rod, wherein between each valve seat and valve cone is formed a radially arranged homogenization gap and an axially arranged homogenization gap with respect to the axis of the valve housing.

2. The homogenizing valve according to claim 1, wherein the valve cones and valve seats are rotationally symmetric.

3. The homogenizing valve according to claim 1, wherein the valve cones are arranged such that they are adjusted, together with the threaded rod, by means of a piston, so that two or more of the radially arranged homogenization gaps have the same gap height h.

4. The homogenizing valve according to claim 1, wherein the valve seats are fixed to the valve housing.

5. The homogenizing valve according to claim 1, wherein a gap height h of at least one of the radially arranged homogenization gaps is adjustable.

6. The homogenizing valve according to claim 1, wherein a gap height h of at least one of the radially arranged homogenization gaps is between 50-200 μm.

7. The homogenizing valve according to claim 1, wherein the axially arranged homogenization gaps are fixed.

8. The homogenizing valve according to claim 1, wherein the valve seats are placed one on top of the other.

9. The homogenizing valve according to claim 1, wherein the valve cones are pressure-loaded.

10. The homogenizing valve according to claim 9, wherein the valve cones are pressure-loaded by a hydraulic or pneumatic piston.

\* \* \* \* \*